US012619671B2

(12) United States Patent

Wang

(10) Patent No.: US 12,619,671 B2

(45) Date of Patent: May 5, 2026

(54) RESOURCE LIST RECOMMENDATION METHOD, TERMINAL DEVICE, AND SERVER

(71) Applicant: ZTE CORPORATION, Shenzhen (CN)

(72) Inventor: Xing Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 8 days.

(21) Appl. No.: 18/845,209

(22) PCT Filed: Jan. 16, 2023

(86) PCT No.: PCT/CN2023/072451

§ 371 (c)(1),
(2) Date: Sep. 9, 2024

(87) PCT Pub. No.: WO2023/221545

PCT Pub. Date: Nov. 23, 2023

(65) Prior Publication Data

US 2025/0190504 A1 Jun. 12, 2025

(30) Foreign Application Priority Data

May 16, 2022 (CN) .......................... 202210529658.6

(51) Int. Cl.
*G06F 16/9535* (2019.01)

(52) U.S. Cl.
CPC ................................ *G06F 16/9535* (2019.01)

(58) Field of Classification Search
CPC ........................ G06F 16/9535; G06F 21/6245
See application file for complete search history.

(56) References Cited

U.S. PATENT DOCUMENTS

| | | | | |
|---|---|---|---|---|
| 2019/0340521 A1* | 11/2019 | Liu | ..................... | G06F 16/9536 |
| 2020/0364770 A1* | 11/2020 | Geraci | .............. | G06Q 30/0633 |
| 2021/0248009 A1 | 8/2021 | Yang et al. | | |
| 2022/0014488 A1* | 1/2022 | Peng | .................... | G06Q 20/386 |
| 2022/0058713 A1* | 2/2022 | Correa | .............. | G06Q 30/0631 |

(Continued)

FOREIGN PATENT DOCUMENTS

| | | |
|---|---|---|
| CN | 111651263 A | 9/2020 |
| CN | 111737573 A | 10/2020 |

(Continued)

OTHER PUBLICATIONS

European Patent Office. Extended European Search Report for EP Application No. 23806507.2, mailed Apr. 24, 2025, pp. 1-11.

(Continued)

*Primary Examiner* — Apu M Mofiz
*Assistant Examiner* — Oscar Wehovz
(74) *Attorney, Agent, or Firm* — Vivacqua Crane, PLLC

(57) ABSTRACT

Disclosed are method for recommending a resource list, a terminal device, and a server. The method may include: acquiring current running information in response to detecting that the interface is invoked; inputting the running information into the local recommendation model to obtain recommendation probabilities of resources in the resource list; and selecting a to-be-recommended resource according to the recommendation probabilities and displaying the to-be-recommended resource.

10 Claims, 5 Drawing Sheets

(56)                    References Cited

U.S. PATENT DOCUMENTS

| | | | | |
|---|---|---|---|---|
| 2022/0245401 A1* | 8/2022 | Lian | ........................ | G06N 3/084 |
| 2023/0078482 A1* | 3/2023 | Ning | ........................ | G06F 9/451 |
| | | | | 715/734 |
| 2023/0084466 A1* | 3/2023 | Zhu | ......................... | G06F 16/45 |
| | | | | 707/737 |

FOREIGN PATENT DOCUMENTS

| | | | |
|---|---|---|---|
| CN | 114218410 A | 3/2022 | |
| EP | 3136265 A1 | 3/2017 | |

OTHER PUBLICATIONS

Mettouris Christos et al: "Ubiquitous recommender systems", Computing, Oct. 8, 2013, pp. 223-257, vol. 96, Springer, Vienna, Austria.
International Searching Authority. International Search Report and Written Opinion for PCT Application No. PCT/CN2023/072451 and English translation, mailed Apr. 18, 2023, pp. 1-10.

\* cited by examiner

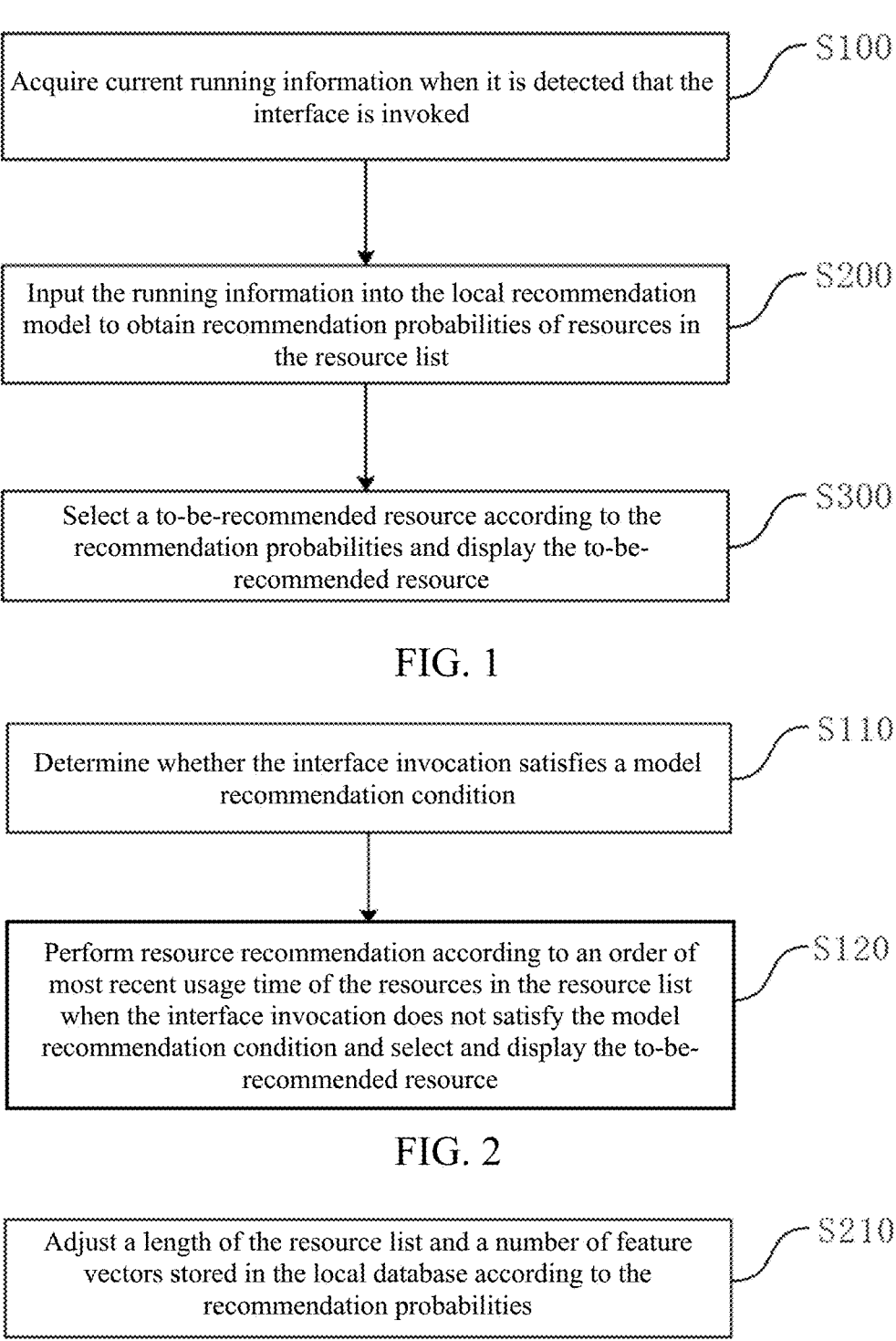

Acquire current running information when it is detected that the interface is invoked ⟋ S100

Input the running information into the local recommendation model to obtain recommendation probabilities of resources in the resource list ⟋ S200

Select a to-be-recommended resource according to the recommendation probabilities and display the to-be-recommended resource ⟋ S300

FIG. 1

Determine whether the interface invocation satisfies a model recommendation condition ⟋ S110

Perform resource recommendation according to an order of most recent usage time of the resources in the resource list when the interface invocation does not satisfy the model recommendation condition and select and display the to-be-recommended resource ⟋ S120

FIG. 2

Adjust a length of the resource list and a number of feature vectors stored in the local database according to the recommendation probabilities ⟋ S210

FIG. 3

Figures 4, 5, 6, 7:
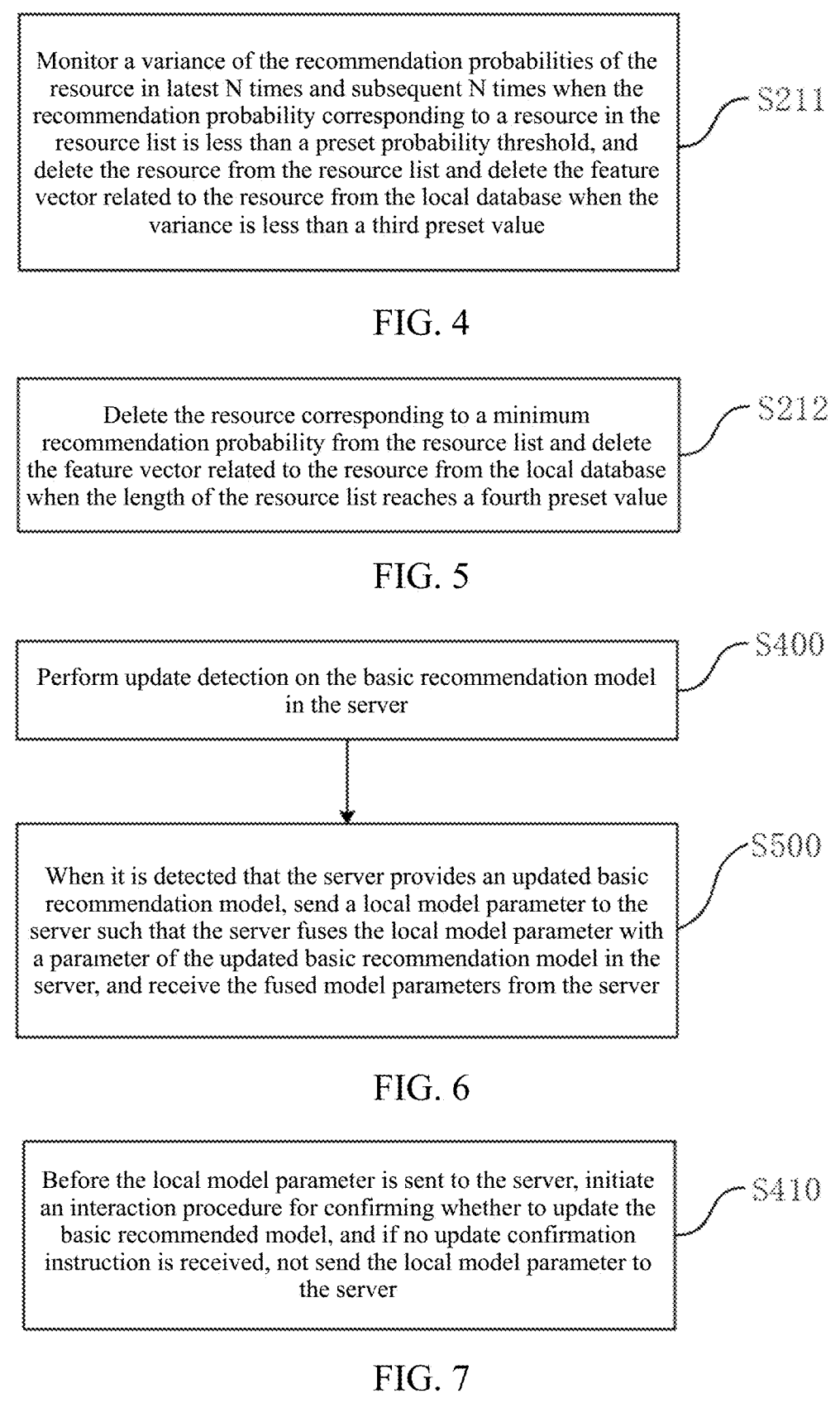

Monitor a variance of the recommendation probabilities of the resource in latest N times and subsequent N times when the recommendation probability corresponding to a resource in the resource list is less than a preset probability threshold, and delete the resource from the resource list and delete the feature vector related to the resource from the local database when the variance is less than a third preset value

Delete the resource corresponding to a minimum recommendation probability from the resource list and delete the feature vector related to the resource from the local database when the length of the resource list reaches a fourth preset value

Perform update detection on the basic recommendation model in the server

S400

When it is detected that the server provides an updated basic recommendation model, send a local model parameter to the server such that the server fuses the local model parameter with a parameter of the updated basic recommendation model in the server, and receive the fused model parameters from the server

Before the local model parameter is sent to the server, initiate an interaction procedure for confirming whether to update the basic recommended model, and if no update confirmation instruction is received, not send the local model parameter to the server

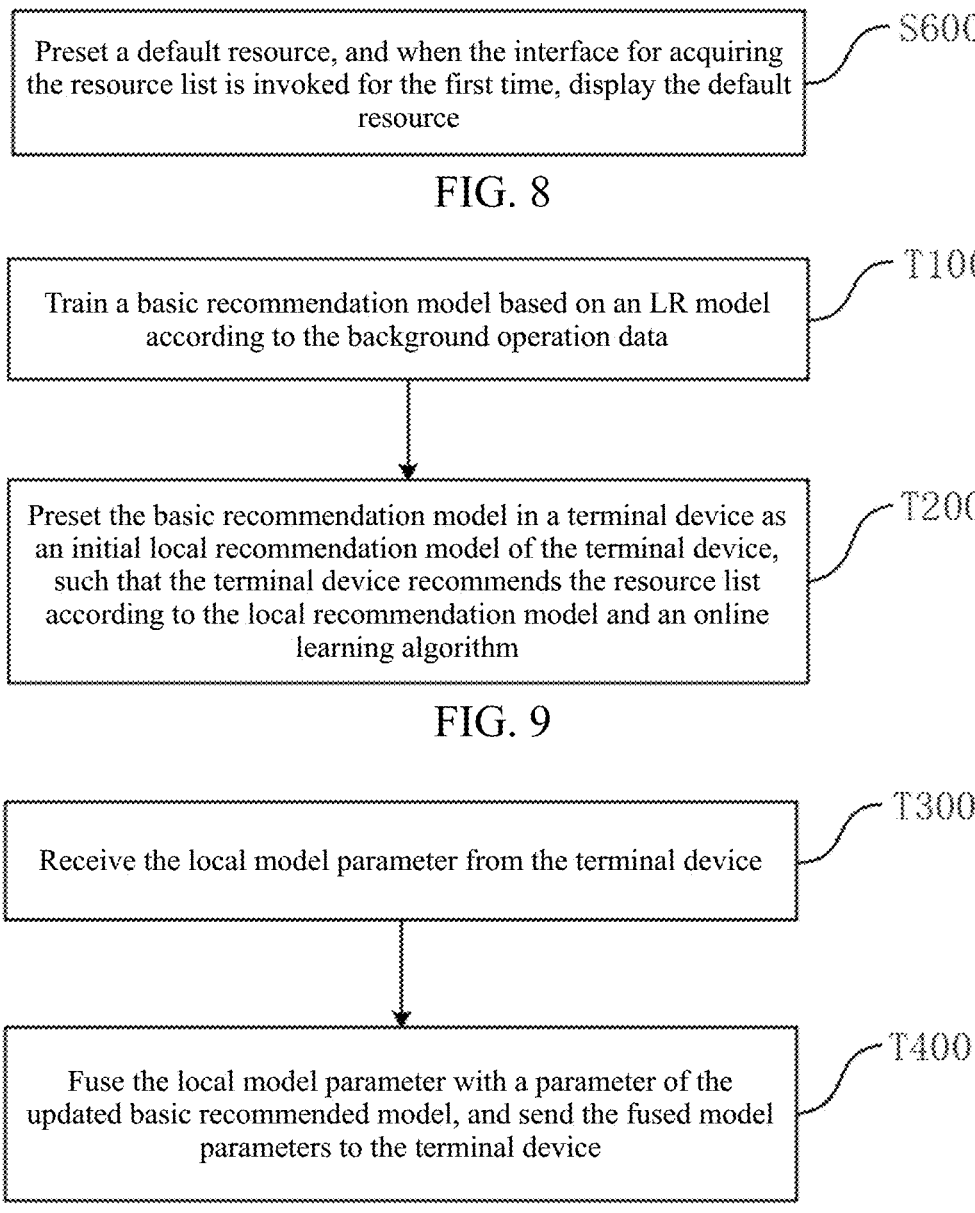

Preset a default resource, and when the interface for acquiring the resource list is invoked for the first time, display the default resource ⟋ S600

FIG. 8

Train a basic recommendation model based on an LR model according to the background operation data ⟋ T100

Preset the basic recommendation model in a terminal device as an initial local recommendation model of the terminal device, such that the terminal device recommends the resource list according to the local recommendation model and an online learning algorithm ⟋ T200

FIG. 9

Receive the local model parameter from the terminal device ⟋ T300

Fuse the local model parameter with a parameter of the updated basic recommended model, and send the fused model parameters to the terminal device ⟋ T400

FIG. 10

RESOURCE LIST RECOMMENDATION METHOD, TERMINAL DEVICE, AND SERVER

CROSS-REFERENCE TO RELATED APPLICATION

This application is a national stage filing under 35 U.S.C. § 371 of international application number PCT/CN2023/072451, filed Jan. 16, 2023, which claims priority to Chinese patent application No. 202210529658.6 filed May 16, 2022. The contents of these applications are incorporated herein by reference in their entirety.

TECHNICAL FIELD

The present disclosure relates to the field of intelligent recommendation, and more particularly, to a method for recommending a resource list, a terminal device, and a server.

BACKGROUND

Currently, most resources recommendation lists in terminal devices are sorted by the most recent usage time. However, when there are too many historical usage records, the number of recommended resources in the list increases accordingly, requiring the user to further search or browse through numerous resources in the list for a particular resource.

SUMMARY

The present disclosure provides a method for recommending a resource list, a terminal device, and a server.

In accordance with a first aspect of the present disclosure, an embodiment provides a method for recommending a resource list, which is applied to a terminal device. The terminal device provides an interface for acquiring the resource list, and the terminal device includes a built-in local recommendation model and updates the local recommendation model based on an online learning algorithm. The method includes: acquiring current running information in response to detecting that the interface is invoked; inputting the running information into the local recommendation model to obtain recommendation probabilities of resources in the resource list; and selecting a to-be-recommended resource according to the recommendation probabilities and displaying the to-be-recommended resource.

In accordance with a second aspect of the present disclosure, an embodiment provides a method for recommending a resource list, which is applied to a server. The server stores background operation data of resources. The method includes: training a basic recommendation model according to the background operation data; and presetting the basic recommendation model in a terminal device as an initial local recommendation model of the terminal device, such that the terminal device recommends the resource list according to the local recommendation model and an online learning algorithm.

In accordance with a third aspect of the present disclosure, an embodiment provides a terminal device, including at least one control processor and a memory communicatively connected to the at least one control processor, where the memory stores instructions executable by the at least one control processor which, when executed by the at least one control processor, cause the at least one control processor to carry out the method for recommending a resource list according to the embodiment of the first aspect of the present disclosure.

In accordance with a fourth aspect of the present disclosure, an embodiment provides a server, including at least one control processor and a memory communicatively connected to the at least one control processor, wherein the memory stores instructions executable by the at least one control processor which, when executed by the at least one control processor, causes the at least one control processor to carry out the method for recommending a resource list according to the embodiment of the second aspect of the present disclosure.

Additional features and advantages of the present disclosure will be outlined in the following description and will, in part, become apparent from the description, or may be learned through the practice of the present disclosure. The purposes and other advantages of the present disclosure can be realized and obtained through the structures particularly pointed out in the description, claims and drawings.

BRIEF DESCRIPTION OF DRAWINGS

The drawings are provided for a further understanding of the technical schemes of the present disclosure, and form part of the description. The drawings and the embodiments of the present disclosure are used to illustrate the technical schemes of the present disclosure, and are not intended to limit them.

The present disclosure is further described below in conjunction with the accompanying drawings and embodiments.

FIG. 1 is a flowchart of steps of a method for recommending a resource list according to an embodiment of the present disclosure;

FIG. 2 is a flowchart of part of steps of another method for recommending a resource list according to an embodiment of the present disclosure;

FIG. 3 is a flowchart of part of steps of another method for recommending a resource list according to an embodiment of the present disclosure;

FIG. 4 is a detailed flowchart of part of steps of another method for recommending a resource list according to an embodiment of the present disclosure;

FIG. 5 is a detailed flowchart of part of steps of another method for recommending a resource list according to an embodiment of the present disclosure;

FIG. 6 is a flowchart of part of steps of another method for recommending a resource list according to an embodiment of the present disclosure;

FIG. 7 is a flowchart of part of steps of another method for recommending a resource list according to an embodiment of the present disclosure;

FIG. 8 is a flowchart of part of steps of another method for recommending a resource list according to an embodiment of the present disclosure;

FIG. 9 is a flowchart of steps of another method for recommending a resource list according to an embodiment of the present disclosure;

FIG. 10 is a flowchart of part of steps of another method for recommending a resource list according to an embodiment of the present disclosure;

DETAILED DESCRIPTION

Figure 11:
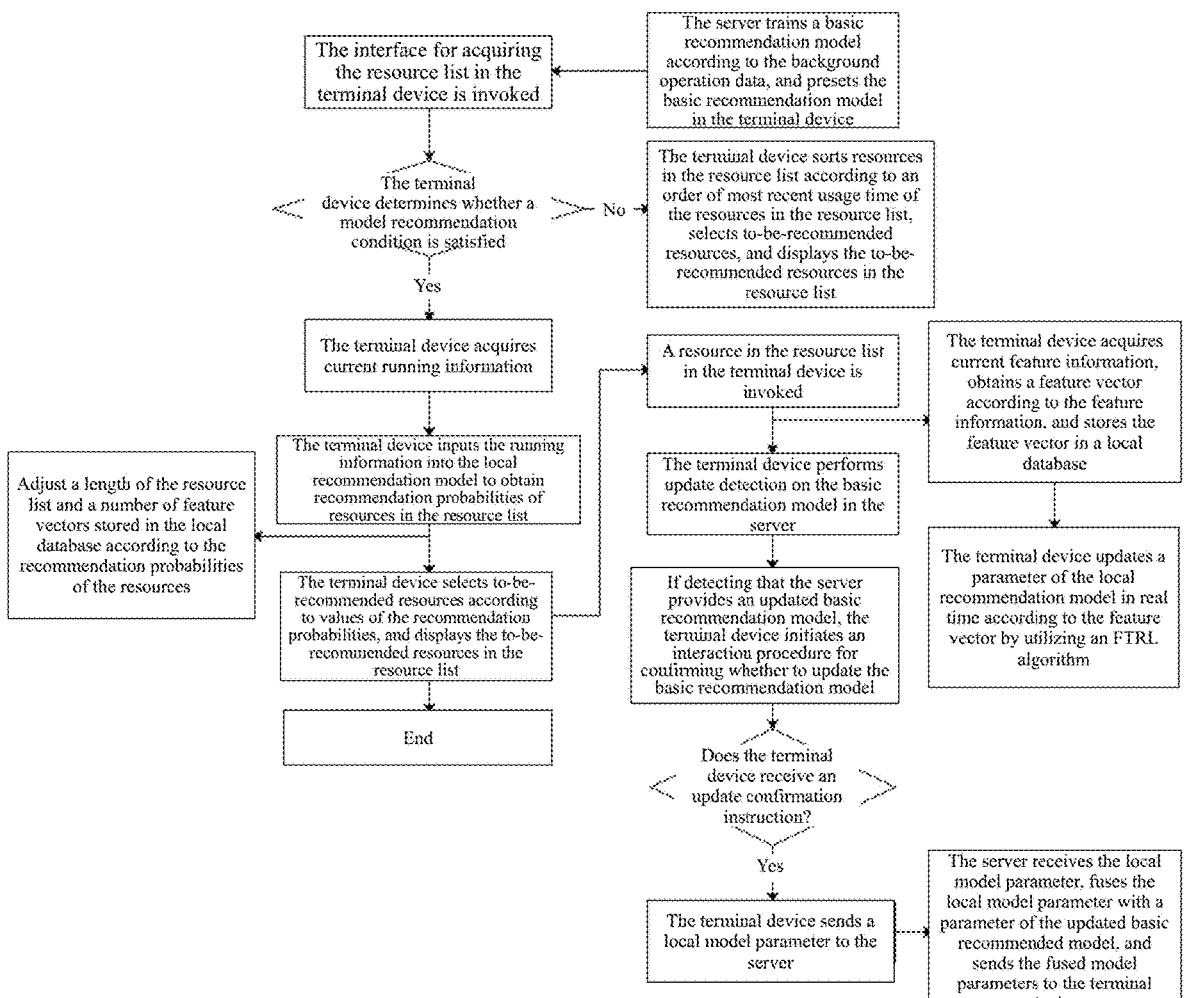
FIG. 11 is a flowchart of a system for recommending a resource list according to an embodiment of the present disclosure.

This section provides a detailed description of specific embodiments of the present disclosure. Embodiments of the present disclosure are illustrated in the accompanying drawings. The function of the accompanying drawings is to use drawings to supplement the description of the text part of the description, such that those having ordinary skills in the art can intuitively and vividly understand each technical feature and the overall technical scheme of the present disclosure, but the accompanying drawings are not intended to be construed as limiting the scope of protection of the present disclosure.

In the description of the present disclosure, the term "at least one" refers to one or more, the term "plurality of (or multiple)" refers to at least two, the term such as "greater than", "less than", "exceed" or variants thereof prior to a number or series of numbers is understood to not include the number adjacent to the term. The term "at least" prior to a number or series of numbers is understood to include the number adjacent to the term "at least", and all subsequent numbers or integers that could logically be included, as clear from the context.

In the description of the present disclosure, unless otherwise explicitly defined, the terms such as "configure", "install/mount" and "connect" should be understood in a broad sense, and those having ordinary skills in the art can reasonably determine the specific meanings of the above terms in the present disclosure based on the specific contents of the technical scheme.

It should be noted that in the specific embodiments of the present disclosure, when data related to a user's identity or characteristics, such as user information, user behavior data, user history data, or user location information, needs to be processed, the user's permission or consent will first be obtained. The collection, use, and processing of such data will comply with relevant laws, regulations, and standards of the applicable countries and regions. Furthermore, in the embodiments of the present disclosure, when sensitive personal information is required, a pop-up window or confirmation page will be displayed to obtain the user's explicit consent. Only after the user's individual permission is obtained will the user-related data necessary for the normal implementation of the embodiments be collected.

The embodiments of the present disclosure provide a method for recommending a resource list, to provide a more intelligent and accurate recommendation result for the user and reduce the risk of personal privacy leakage.

The embodiments of the present disclosure will be further described in detail below in conjunction with the accompanying drawings.

FIG. 1 is a flowchart of steps of a method for recommending a resource list according to an embodiment of the present disclosure. The method is applied to a terminal device. The terminal device provides an interface for acquiring the resource list, and the terminal device includes a built-in local recommendation model and updates the local recommendation model based on an online learning algorithm. As shown in FIG. 1, the method may include the following steps S100, S200, and S300.

At S100, current running information is acquired when it is detected that the interface is invoked.

At S200, the running information is input into the local recommendation model to obtain recommendation probabilities of resources in the resource list.

At S300, a to-be-recommended resource is selected according to the recommendation probabilities and displayed.

In an embodiment, the terminal device provides an interface for acquiring the resource list, the terminal device includes a built-in local recommendation model and updates the local recommendation model based on an online learning algorithm, and the terminal device is configured for performing resource recommendation according to the local recommendation model. Iterative update of the local recommendation model is realized based on the online learning algorithm. Each time when the user uses a resource, the local recommendation model is updated quickly, so as to learn a resource usage habit of the user quickly and accurately. When the user needs to acquire the resource list, the terminal device detects that the interface is invoked, acquires current running information, inputs the running information into the local recommendation model to obtain recommendation probabilities of resources, selects a to-be-recommended resource according to the recommendation probabilities, and displays the to-be-recommended resource. In this way, a more intelligent and accurate recommendation result is provided for the user. In addition, the local recommendation model is stored in the terminal device, and the model updating process is also performed locally, i.e., in the terminal device, such that information related to usage of resources by the user does not need to be uploaded to a server, thereby reducing the risk of leakage of the user's personal privacy.

It should be noted that the interface in the present disclosure may be a virtual interface. When the user operates the terminal device to acquire a resource list, a state corresponding to the terminal device is that the interface is invoked.

It should also be noted that the resources in the resource list in the present disclosure are resources that can be included in the resource list by the terminal device and have been invoked by the user. For example, if the resource list is a quick application recommendation list of the terminal device, the resources in the resource list are quick applications that have been used by the user in the terminal device. If the resource list is a small program recommendation list in an application, the resources in the resource list are small programs that have been invoked by the user.

It can be understood that the running information is reference information for selecting the to-be-recommended resource, and the running information is input into the local recommendation model to obtain the recommendation probabilities of the resources in the resource list. The running information may include one or more of: current location information, a time period in which the resource is invoked, usage frequency of the resource, a category of the resource, an average invocation duration of the resource, a running status of a resource associated with the resource, or a search keyword. However, the running information is not particularly limited in the embodiments of the present disclosure, and the running information may also include other information that can help select the to-be-recommended resource. According to the method provided in the embodiment of the present disclosure, resource recommendation probabilities that are in line with the expectation of the user can be obtained according to the running information and the local recommendation model, thereby providing an intelligent and accurate recommendation result for the user.

It should also be noted that after obtaining the recommendation probabilities of the resources in the resource list, the to-be-recommended resources can be selected in a descending order of the recommendation probabilities, and the selected to-be-recommended resources are displayed in the resource list for the user to select.

It should also be noted that the resource list may be a retained quick application recommendation list, and a quick application framework such as a quick application engine of a communication company needs to be built in the terminal device. It can be understood by those having ordinary skills in the art that a quick application can be smoothly used by one click without being downloaded and installed. With the use of the quick application framework deeply integrated in an operating system of the terminal device, a seamless connection between user requirements and application services can be formed at the operating system level, such that the user can enjoy the native application experience without worrying about distribution and retention, and the resource consumption is relatively small. At present, many terminal devices provide quick application services such as global search, leftmost home screen, and browser search. Of course, the resource list may also be a recommendation list of applications installed on the terminal device, a dynamic recommendation list similar to a small program list, or a recommendation list of local photos or files, all of which fall within the protection scope of the embodiments of the present disclosure.

It can be understood by those having ordinary skills in the art that the online learning algorithm is a commonly used machine learning algorithm, which can have satisfactory results in many scenarios. The online learning algorithm updates the model by utilizing only currently obtained samples in each training, thereby reducing the learning complexity.

In an embodiment, a scheme of updating the local recommendation model based on an online learning algorithm by the terminal device is provided, which includes: acquiring current feature information in response to an invocation of a resource in the resource list; obtaining a feature vector corresponding to the resource invocation according to the current feature information; and updating a parameter of the local recommendation model in real time according to the feature vector. Each time when the user uses a resource, the parameter of the local recommendation model is updated quickly, to continuously learn a resource usage habit of the user in real time, such that the local recommendation model can better adapt to the user's usage habit to provide a more accurate recommendation result.

It should be noted that the feature information is information involved in the resource invocation, and is used for updating the parameter of the local recommendation model. The running information is used as reference information for selecting the to-be-recommended resource, to obtain recommendation probabilities of the resources in the resource list. The running information may include information of the same type as the feature information, but may also include certain information different from the feature information. For example, if schedule planning information of the user is stored in the terminal device, the running information may include the schedule planning information to provide a more intelligent and accurate resource recommendation result for the user.

In an embodiment, the feature information includes one or more of: current location information, a time period in which the resource is invoked, usage frequency of the resource, a category of the resource, an average invocation duration of the resource, a running status of a resource associated with the resource, or a search keyword.

It can be understood that locations and periods where resources are used are bound to a certain extent to resource services that the user is accustomed to using. For example, an application resource for viewing stocks is generally invoked in a particular time period of a working day, and a resource service for taxi hailing is often invoked at a particular place during off-duty hours. In addition, categories, invocation frequencies, and invocation durations of the invoked resources can also reflect some resource acquisition preferences of the user in a period of time. Moreover, usage information of associated resources and search keywords reflect the changes of the user's usage habits, indicating that the user have the awareness of looking for new service resources. By cleaning and standardizing the feature information, standardized and unified feature vectors can be obtained. The local recommendation model is then trained using these feature vectors, such that the local recommendation model can reflect the changes of the user's usage habits in time.

It should be noted that the feature information is not particularly limited in the embodiments of the present disclosure, and the feature information may also include other information that can affect the user's usage habits, such as current weather conditions. For some office workers, they usually go out for lunch on weekdays, but prefer to order take-out in rainy days, so recommendation probabilities of take-out platforms can be increased for such users in rainy days through training. Similarly, the running information may also include current environment information.

In an embodiment, the terminal device trains a basic recommendation model according to the feature vector to update the local recommendation model, including updating the parameter of the local recommendation model according to the feature vector by utilizing a Follow-the-regularized-Leader (FTRL) algorithm. The FTRL algorithm is an online learning algorithm that combines the accuracy of Forward Backward Splitting (FOBOS) and the satisfactory sparsity of Regularized Dual Averaging (RDA). In this embodiment, the FTRL algorithm is mainly used for updating a feature weight of the local recommendation model, so as to realize the quick updating of the model by the online learning algorithm.

It should be noted that the parameter of the model may also be updated using other online learning algorithms, which also fall within the protection scope of the embodiments of the present disclosure.

FIG. 2 is a flowchart of part of steps of another method for recommending a resource list according to an embodiment of the present disclosure. The method is applied to a terminal device. Based on the method shown in FIG. 1, before the terminal device acquires current running information when it is detected that the interface is invoked, the method further includes the following steps S110 and S120.

At S110, it is determined whether the interface invocation satisfies a model recommendation condition.

At S120, when the interface invocation does not satisfy the model recommendation condition, resource recommendation is performed according to an order of most recent usage of the resources in the resource list and the to-be-recommended resource is selected and displayed.

In an embodiment, when the interface is invoked, it is determined whether the interface invocation satisfies the model recommendation condition; and when the interface invocation does not satisfy the model recommendation condition, resource recommendation is performed according to the order of the most recent usage of the resources in the resource list and the to-be-recommended resource is selected; or when the interface invocation satisfies the model recommendation condition, resource recommendation is performed using the local recommendation model. It can be understood that at the early stage, because the user just starts using the resource list and the local recommendation model has not been updated for a certain number of times according to the user's personal usage habits, the local recommendation model cannot accurately reflect the user's usage habits, and the recommendation result obtained based on the local recommendation model is not accurate and personalized enough. Therefore, at the early stage, when the interface is invoked but related information of the terminal device does not satisfy the model recommendation condition, resource recommendation can be performed according to the order of the most recent usage time of the resources in the resource list, and a resource newly used by the user is added into the resource list. At this stage, the terminal device performs iterative update of the local recommendation model in the background to learn the resource usage habit of the user. If the related information of the terminal device satisfies the model recommendation condition in the case of another invocation of the interface, it indicates that the parameter of the local recommendation model has been updated to a certain extent, and the local recommendation model can well reflect the user's usage habits. Therefore, subsequently the local recommendation model can be used to provide a more intelligent and accurate resource recommendation for the user.

In an embodiment, the model recommendation condition is that a number of resources contained in the resource list is greater than or equal to a first preset value. With the increase of the number of resources having been used by the user, the number of resources contained in the resource list also increases, i.e., the length of the resource list increases. When the number of resources contained in the resource list is greater than or equal to the first preset value, it indicates that the local recommendation model has been trained to a certain extent, and subsequently the local recommendation model can be used to provide a more intelligent and accurate resource recommendation for the user.

It should be noted that the first preset value may be 10, 8, 12, or any other value that can enable the terminal device to use the local recommendation model for resource recommendation in an appropriate time period, which is not particularly limited in the embodiments of the present disclosure, and all these values fall within the protection scope of the embodiments of the present disclosure.

In another embodiment, the feature vector is stored in a local database of the terminal device, and the model recommendation condition is that a number of feature vectors stored in the local database is greater than a second preset value. With the increase of the number of resources having been used by the user, the number of feature vectors stored in the local database also increases. When the number of feature vectors stored in the local database is greater than or equal to the second preset value, it indicates that the local recommendation model has been trained to a certain extent, and subsequently the local recommendation model can be used to provide a more intelligent and accurate resource recommendation for the user.

It should be noted that the second preset value may be 100 or any other value that can enable the terminal device to use the local recommendation model for resource recommendation in an appropriate time period, which is not particularly limited in the embodiments of the present disclosure, and all these values within the protection scope of the embodiments of the present disclosure.

It should also be noted that when the interface for acquiring the resource list is invoked, the terminal device can enable the local recommendation model to provide a recommendation service as long as the model recommendation condition provided in any of the above two embodiments is satisfied.

FIG. 3 is a flowchart of part of steps of another method for recommending a resource list according to an embodiment of the present disclosure. The method is applied to a terminal device. The feature vector is stored in a local database of the terminal device. After inputting the running information into the local recommendation model to obtain recommendation probabilities of resources in the resource list, the method further includes a following step S210.

At S210, a length of the resource list and a number of feature vectors stored in the local database are adjusted according to the recommendation probabilities.

In an embodiment, after the running information is input into the local recommendation model to obtain the recommendation probabilities of the resources in the resource list, the length of the resource list and the number of feature vectors stored in the local database are adjusted according to the recommendation probabilities. Because the local recommendation model is deployed in the terminal device and the training process of the local recommendation model is performed in the terminal device, the length of the resource list can be dynamically changed and useless feature vectors can be deleted in time to ensure the computing performance and storage performance of the terminal device and provide a concise and personalized resource list. In this way, the number of feature vectors stored is kept within a certain range to prevent the terminal device from jamming and ensure normal running of the local recommendation model.

FIG. 4 is a detailed flowchart of S210 in FIG. 3. In an embodiment, as shown in FIG. 4, S210 includes a following step S211.

At S211, when the recommendation probability corresponding to a resource in the resource list is less than a preset probability threshold, a variance of the recommendation probabilities of the resource in latest N times and subsequent N times is monitored, and when the variance is less than a third preset value, the resource is deleted from the resource list and the feature vector related to the resource is deleted from the local database, where N is a positive integer.

It can be understood that if the recommendation probability corresponding to a resource in the resource list is less than the preset probability threshold, and the variance of the recommendation probabilities of the resources in the latest N times and the subsequent N times is less than the third preset value, it indicates that the user does not frequently use the resource in this period. In this case, the resource can be deleted from the resource list to reduce the length of the resource list, and the feature vector related to the resource in the local database can be deleted to reduce the number of feature vectors stored in the local database, so as to improve the running stability of the local recommendation model on the terminal device to a certain extent.

It should be noted that the preset probability threshold, the third preset value, and the value of N are not particularly limited in the embodiments of the present disclosure. N may be 15. The preset probability threshold, the third preset value, and N may have any values, as long as the resources not frequently used in the resource list and the related feature vectors in the local database can be deleted in time according to the method, and all these values fall within the protection scope of the embodiments of the present disclosure.

FIG. 5 is another detailed flowchart of S210 in FIG. 3. In another embodiment, as shown in FIG. 5, S210 includes a following step S212.

At S212, when the length of the resource list reaches a fourth preset value, the resource corresponding to a minimum recommendation probability is deleted from the resource list and the feature vector related to the resource is deleted from the local database.

It can be understood that because the local recommendation model is deployed in the terminal device and the training process of the local recommendation model is performed in the terminal device, the resource list should not be too long, so as to ensure the computing performance and storage performance of the terminal device and provide a concise and personalized resource list. When the length of the resource list reaches the fourth preset value, the resource corresponding to the minimum recommendation probability may be deleted from the resource list and the feature vector related to the resource may be deleted from the local database to reduce the number of feature vectors stored in the local database, so as to improve the running stability of the local recommendation model on the terminal device to a certain extent, thereby keeping the conciseness of the resource list and improving the use experience of the user.

It should be noted that the fourth preset value may be 12, 15, or any other value that can ensure that the length of the resource list will not be too long, which is not particularly limited in the embodiments of the present disclosure, and all these values fall within the protection scope of the embodiments of the present disclosure.

FIG. 6 is a flowchart of part of steps of another method for recommending a resource list according to an embodiment of the present disclosure. The method is applied to a terminal device. The terminal device includes a built-in local recommendation model, and the local recommendation model is initially a basic recommendation model. The basic recommendation model is obtained through training by a server. Based on the method shown in FIG. 5, as shown in FIG. 6, the method further includes the following steps S400 and S500.

At S400, update detection is performed on the basic recommendation model in the server.

At S500, when it is detected that the server provides an updated basic recommendation model, a local model parameter is sent to the server such that the server fuses the local model parameter with a parameter of the updated basic recommendation model in the server, and the fused model parameters are received from the server.

In an embodiment, the initial local recommendation model built in the terminal device is a basic recommendation model which is obtained through training by the server. The terminal device is configured to perform update detection on the basic recommendation model in the server. If detecting that the server provides an updated basic recommendation model, the terminal device sends a local model parameter to the server such that the server fuses the local model parameter with a parameter of the updated basic recommendation model in the server, and receives the fused model parameters from the server. The local model parameter is a model parameter of the local recommendation model. In this way, when some resources upgrade automatically and the basic recommendation model in the server is updated and upgraded, the local recommendation model can be optimized and upgraded accordingly while maintaining existing personalized features of the user, thereby providing a more intelligent and accurate recommendation result for the user. In addition, the terminal device uploads only the model parameter of the local recommendation model to the server, such that the personal privacy of the user can be protected, thereby reducing the risk of leakage of resource usage information of the user.

FIG. 7 is a flowchart of part of steps of another method for recommending a resource list according to an embodiment of the present disclosure. In the embodiment, as shown in FIG. 7, the method is applied to a terminal device. Based on the method shown in FIG. 6, the method further includes a following step S410.

At S410, before the local model parameter is sent to the server, an interaction procedure for confirming whether to update the basic recommended model is initiated, and if no update confirmation instruction is received, the local model parameter is not sent to the server.

In this embodiment, before sending the local model parameter to the server, the terminal device initiates an interaction procedure for confirming whether to update the basic recommended model, to determine whether to update the built-in basic recommendation model to update the model parameter of the local recommendation model. If no update confirmation instruction is received, the terminal device does not send the local model parameter to the server, i.e., does not update the basic recommendation model. If an update confirmation instruction is received, i.e., the user confirms the update, the terminal device sends the local model parameter to the server to update the basic recommended model.

It can be understood that in the process of confirming whether to update the basic recommendation model, the user can decide whether to update the model parameter by himself or herself, and can also select a time period for updating. For example, when detecting that the server provides an updated basic recommendation model, the terminal device initiates an interaction procedure for update confirmation to the user. In this case, if the user is satisfied with use experience of the current resource list, the user may choose not to update the model parameter; or if the user thinks that it is necessary to update the model parameter, the user may choose to update the model parameter immediately or in a rest time period at night.

It can also be understood that the terminal device may initiate the interaction procedure for update confirmation to the user only during off-duty hours or a particular time period set by the user, so as to avoid disturbing the work and life of the user and further enhance the use experience of the user.

FIG. 8 is a flowchart of part of steps of another method for recommending a resource list according to an embodiment of the present disclosure. The method is applied to a terminal device. Based on the method shown in FIG. 7, the method further includes a following step S600.

At S600, a default resource is preset, and when the interface for acquiring the resource list is invoked for the first time, the default resource is displayed.

In an embodiment, a default resource is preset in the terminal device, and when the interface for acquiring the resource list is invoked for the first time, the default resource is displayed. It can be understood that if no resource is displayed to the user when the user uses the resource list for the first time, the user has to search for some commonly used resources, leading to unsatisfactory user experience. Through the display of the default resource, the problem of unsatisfactory user experience caused by display of blank space during interaction can be avoided.

It should be noted that a plurality of resources commonly used by the public may be obtained according to a background operation result of the server and set as default resources, or default resources may be generated according to search keywords recently searched by the user in the terminal device; and the default resources are preset in the resource list and are displayed to the user only when the user uses the resource list for the first time. The default resources may also be set using other methods, which is not particularly limited in the embodiments of the present disclosure, and any presetting method can be used as long as the display of blank space during interaction can be avoided.

FIG. 9 is a flowchart of steps of a method for recommending a resource list according to an embodiment of the present disclosure. The method is applied to a server. The server stores background operation data of resources. The method includes the following steps T100 and T200.

At T100, a basic recommendation model is trained according to the background operation data.

At T200, the basic recommendation model is preset in a terminal device as an initial local recommendation model of the terminal device, such that the terminal device recommends the resource list according to the local recommendation model and an online learning algorithm.

In an embodiment, the server stores background operation data of resources, the basic recommendation model is trained according to the background operation data, and the basic recommendation model is preset in the terminal device as the initial local recommendation model of the terminal device, such that the terminal device recommends the resource list according to the local recommendation model and the online learning algorithm. The server presets the basic recommendation model in the terminal device. The basic recommendation model can be used as the initial local recommendation model in the terminal device. Subsequently, the terminal device can update the parameter of the local recommendation model in real time based on the online learning algorithm, and perform resource recommendation according to the local recommendation model. The terminal device iteratively updates the model locally, without requiring uploading of personal resource usage information of the user to the server, such that the risk of leakage of the user's personal privacy can be reduced while providing a more intelligent and accurate recommendation service for the user.

It should be noted that the basic recommendation model may be a model based on a Logistic Regression (LR) model, or may be other types of models, as long as the basic recommendation model can be updated based on the online learning algorithm and used for selecting to-be-recommended resources, which is not particularly limited in the embodiments of the present disclosure, and.

It should be noted that for some resources, such as photos and files stored in the terminal device, the server does not have background running data of these resources and therefore no longer trains the model, but instead, uses a default model as the basic recommendation model and presets the default model in the terminal device. The terminal device may train the model according to information related to the invocation of the resources. When the model has been trained to a certain extent, the model is used to provide an intelligent and accurate recommendation service for the user. This scheme also falls within the protection scope of the embodiments of the present disclosure.

FIG. 10 is a flowchart of part of steps of another method for recommending a resource list according to an embodiment of the present disclosure. The method is applied to a server. The terminal device is configured for updating a local model parameter of the local recommendation model based on an online learning algorithm, and the server is configured for updating the basic recommendation model. Based on the method shown in FIG. 9, the method further includes the following steps T300 and T400.

At T300, the local model parameter is received from the terminal device.

At T400, the local model parameter is fused with a parameter of the updated basic recommended model, and the fused model parameters are sent to the terminal device.

In an embodiment, when the basic recommendation model in the server is upgraded and updated, and the terminal device detects that the server provides the updated basic recommendation model, the terminal device may update the parameter of the local recommendation model. The server receives the local model parameter from the terminal device, fuses the local model parameter with the parameter of the updated basic recommendation model, and sends the fused model parameters to the terminal device. Alternatively, the terminal device may not update the model parameter, in which case the terminal device does not send the local model parameter to the server. In this way, when the basic recommendation model in the server is upgraded and updated, an opportunity is provided for the user to update the local recommendation model, and the model parameter is updated according to an intention of the user, so as to provide a more intelligent and accurate recommendation service for the user. In addition, in the process of updating the parameter of the local recommendation model for the terminal device, the server only needs to receive the local model parameter from the terminal device and does not need to directly acquire the resource usage information of the user, thereby reducing the risk of leakage of the user's privacy.

FIG. 11 is a flowchart of a system for recommending a resource list according to an embodiment of the present disclosure. The system includes a terminal device and a server. The server stores background operation data of resources. The server trains a basic recommendation model according to the background operation data, and presets the basic recommendation model in the terminal device. The basic recommendation model is an initial local recommendation model in the terminal device. The terminal device provides an interface for acquiring the resource list. When the interface is invoked, the terminal device determines whether a model recommendation condition is satisfied. If the model recommendation condition is not satisfied, the terminal device sorts resources in the resource list according to an order of most recent usage time of the resources in the resource list, with the recently used resources being ranked in front, selects to-be-recommended resources, and displays the to-be-recommended resources in the resource list. When the model recommendation condition is satisfied, the terminal device acquires current running information, and inputs the current running information into the local recommendation model to obtain recommendation probabilities of the resources in the resource list. The terminal device sorts the resources in the resource list according to values of the recommendation probabilities, with the resources with high recommendation probabilities being ranked in front, selects to-be-recommended resources, and displays the to-be-recommended resources in the resource list. If the user does not click on a resource in the resource list when the resource list is displayed to the user, i.e., no resource is invoked, the process ends. If the user clicks on a resource in the resource list when the resource list is displayed to the user, i.e., a resource is invoked, the terminal device acquires feature information corresponding to the resource invocation, obtains a feature vector according to the feature information, and stores the feature vector in a local database. The terminal device updates a parameter of the local recommendation model in real time according to the feature vector by utilizing an FTRL algorithm, such that the local recommendation model continuously learns usage habits of the user, thereby providing a more intelligent and accurate recommendation result for the user. In addition, because the local recommendation model is deployed in the terminal device, resource usage information of the user does not need to be uploaded to the server, such that the risk of leakage of the user's personal privacy can be reduced. The terminal device further performs update detection on the basic recommendation model in the server during use by the user, and if detecting that the server provides an updated basic recommendation model, the terminal device initiates an interaction procedure for confirming whether to update the basic recommendation model, i.e., for the user to confirm whether to update the basic recommendation model built in the terminal device, i.e., whether to update the model parameter of the local recommendation model according to the updated basic recommendation model provided by the server. If the user confirms the update, i.e., the terminal device receives an update confirmation instruction, the terminal device sends a local model parameter to the server. The server receives the local model parameter, fuses the local model parameter with a parameter of the updated basic recommended model, and sends the fused model parameters to the terminal device. The terminal device receives the fused model parameters to complete the update. In this way, when the basic recommendation model in the server is updated, the local recommendation model can be updated and optimized accordingly while maintaining personalized features of the user that have been obtained through training, thereby providing a more intelligent and accurate recommendation result for the user. In addition, the terminal device uploads only the model parameter of the local recommendation model to the server, such that the personal privacy of the user can be protected, thereby reducing the risk of leakage of resource usage information of the user in the process of updating the model parameter.

Moreover, after obtaining the recommendation probabilities of the resources according to the local recommendation model, the terminal device can adjust the length of the resource list and the number of feature vectors stored in the local database according to the recommendation probabilities of the resources, to keep the conciseness of the resource list to improve the use experience of the user, and prevent the number of feature vectors stored in the local database from being too large, so as to adapt to the storage performance and computing performance of the terminal device and facilitate the normal running of the local recommendation model.

It can be understood that at the early stage, the user just starts using the resource list, the number of resources having been used by the user is small, and the local recommendation model has not well learned the user's personal usage habits. At this stage, resources may be recommended for the user according to the order of historical usage time of the resources. After the local recommendation model is trained to a certain degree, the local recommendation model is used to provide a recommendation service for the user. As such, the use experience of the user can be improved.

It should be noted that the model recommendation condition may be that a number of resources contained in the resource list is greater than or equal to a first preset value, or may be that a number of feature vectors stored in the local database is greater than a second preset value. When either one of the above two conditions is satisfied, i.e., the model recommendation condition is satisfied, the terminal device uses the local recommendation model to provide a recommendation service for the user.

It should also be noted that a plurality of default resources are further preset in the terminal device, and when the interface for acquiring the resource list in the terminal device is invoked for the first time, the default resources are displayed to the user in the resource list to avoid the display of blank space on the interaction interface.

Figure 12:
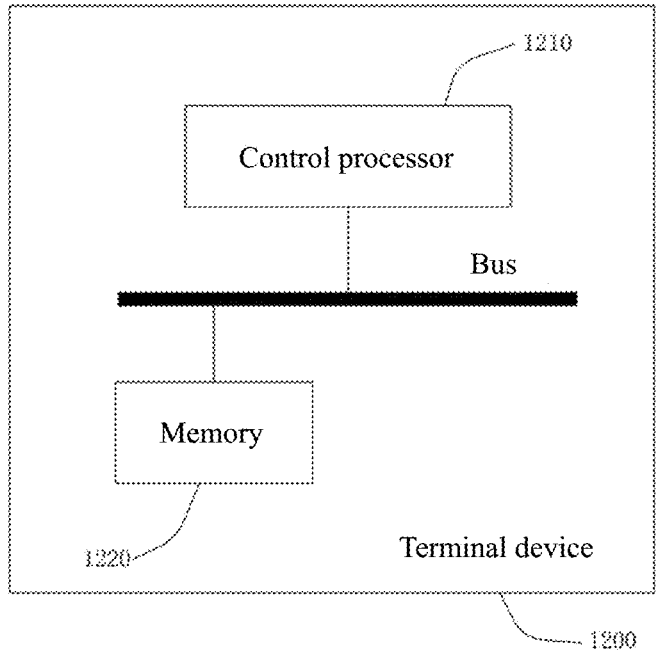
FIG. 12 is a schematic structural diagram of a terminal device according to an embodiment of the present disclosure.

FIG. 12 is a schematic structural diagram of a terminal device 1200 according to an embodiment of the present disclosure. The terminal device 1200 includes at least one control processor 1210 and a memory 1220 communicatively connected to the at least one control processor 1210. The memory 1220 stores instructions executable by the at least one control processor 1210 which, when executed by the at least one control processor 1210, cause the at least one control processor 1210 to implement the method for recommending a resource list that is applied to a terminal device according to the foregoing method embodiments. The terminal device 1200 provided in this embodiment can iteratively update the local recommendation model based on an online learning algorithm to constantly adapt to the user's usage habits, thereby recommending a resource list for the user more intelligently and accurately. In addition, because the model training process is performed locally in the terminal device, personal usage information of the user does not need to be uploaded to the server, such that the risk of leakage of the user's personal privacy can be reduced.

Figure 13:
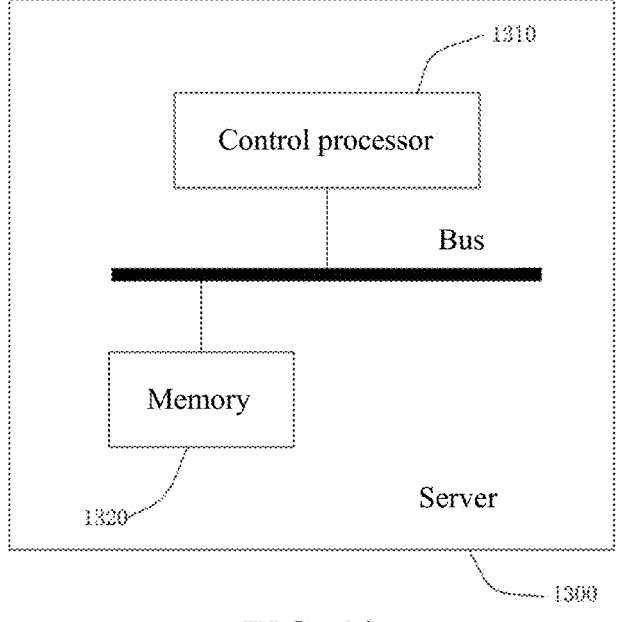
FIG. 13 is a schematic structural diagram of a server according to an embodiment of the present disclosure.

FIG. 13 is a schematic structural diagram of a server 1300 according to an embodiment of the present disclosure. The server 1300 includes at least one control processor 1310 and a memory 1320 communicatively connected to the at least one control processor 1310. The memory 1320 stores instructions executable by the at least one control processor 1310 which, when executed by the at least one control processor 1310, causes the at least one control processor 1310 to execute the method for recommending a resource list that is applied to a server according to the foregoing method embodiments.

The embodiments of the present disclosure include: a method for recommending a resource list, which is applied to a terminal device; a method for recommending a resource list, which is applied to a server; a terminal device; and a server. According to the schemes provided in the embodiments of the present disclosure, the terminal device provides an interface for acquiring the resource list, includes a built-in local recommendation model and updates the local recommendation model based on an online learning algorithm. When detecting that the interface is invoked, the terminal device acquires current running information, inputs the running information into the local recommendation model to obtain recommendation probabilities of resources, selects a to-be-recommended resource according to the recommendation probabilities, and displays the to-be-recommended resource in the list. With the schemes provided in the embodiments of the present disclosure, the local recommendation model can be iteratively updated based on the online learning algorithm to constantly adapt to the user's usage habits, thereby providing a more intelligent and accurate recommendation result for the user. In addition, because the model updating process is performed locally in the terminal device, personal usage information of the user does not need to be uploaded to the server, such that the risk of leakage of the user's personal privacy can be reduced.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium or non-transitory medium and a communication medium or transitory medium. As is known to those having ordinary skills in the art, the term "computer storage medium" includes volatile and nonvolatile, removable and non-removable media implemented in any method or technology for storage of information such as computer readable instructions, data structures, program modules, or other data. The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

The embodiments of the present disclosure have been described in detail above in conjunction with the accompanying drawings, but the present disclosure is not limited to the above embodiments, and various changes may be made within the knowledge of those having ordinary skills in the art without departing from the protection scope of the present disclosure.

The invention claimed is:

1. A method for recommending a resource list, applied to a terminal device, wherein the terminal device provides an interface for acquiring the resource list, and the terminal device comprises a built-in local recommendation model and updates the local recommendation model based on an online learning algorithm, the method comprising:

acquiring current running information in response to detecting that the interface is invoked;

inputting the running information into the local recommendation model to obtain recommendation probabilities of resources in the resource list; and selecting a to-be-recommended resource according to the recommendation probabilities and displaying the to-be-recommended resource;

wherein updating the local recommendation model based on the online learning algorithm comprises:

acquiring current feature information in response to an invocation of a resource in the resource list;

obtaining a feature vector corresponding to the resource invocation according to the feature information; and updating a parameter of the local recommendation model according to the feature vector;

wherein the feature vector is stored in a local database of the terminal device, and the method further comprises:

after inputting the running information into the local recommendation model to obtain recommendation probabilities of resources in the resource list, adjusting a length of the resource list and a number of feature vectors stored in the local database according to the recommendation probabilities, comprising:

in response to the recommendation probability corresponding to a resource in the resource list being less than a preset probability threshold, monitoring a variance of the recommendation probabilities of the resource in latest N times and subsequent N times, and in response to the variance being less than a third preset value, deleting the resource from the resource list and deleting the feature vector related to the resource from the local database, wherein N is a positive integer.

2. The method for recommending the resource list of claim 1, wherein after detecting that the interface is invoked, the method further comprises:

determining whether the interface invocation satisfies a model recommendation condition; and in response to the interface invocation not satisfying the model recommendation condition, performing resource recommendation according to an order of most recent usage of the resources in the resource list and selecting and displaying the to-be-recommended resource.

3. The method for recommending the resource list of claim 2, wherein the feature vector is stored in a local database of the terminal device, and the model recommendation condition comprises one of the following two conditions:

a number of resources contained in the resource list is greater than or equal to a first preset value; or a number of feature vectors stored in the local database is greater than a second preset value.

4. The method for recommending the resource list of claim 1, wherein adjusting a length of the resource list and a number of feature vectors stored in the local database according to the recommendation probabilities further comprises:

in response to the length of the resource list reaching a fourth preset value, deleting the resource corresponding to a minimum recommendation probability from the resource list and deleting the feature vector related to the resource from the local database.

5. The method for recommending the resource list of claim 1, wherein the local recommendation model is initially a basic recommendation model, the basic recommendation model is obtained through training by a server, and the method further comprises:

performing update detection on the basic recommendation model in the server; and in response to detecting that the server provides an updated basic recommendation model, sending a local model parameter to the server such that the server fuses the local model parameter with a parameter of the updated basic recommendation model in the server, and receiving the fused model parameters from the server.

6. The method for recommending the resource list of claim 1, wherein the feature information comprises one or more of: current location information, a time period in which the resource is invoked, usage frequency of the resource, a category of the resource, an average invocation duration of the resource, a running status of a resource associated with the resource, or a search keyword.

7. The method for recommending the resource list of claim 1, further comprising: presetting a default resource, and in response to the interface for acquiring the resource list being invoked for the first time, displaying the default resource.

8. A terminal device, comprising at least one control processor and a memory communicatively connected to the at least one control processor, wherein the memory stores instructions executable by the at least one control processor which, when executed by the at least one control processor, cause the at least one control processor to carry out a method for recommending a resource list, applied to a terminal device, wherein the terminal device provides an interface for acquiring the resource list, and the terminal device comprises a built-in local recommendation model and updates the local recommendation model based on an online learning algorithm, the method comprising:

acquiring current running information in response to detecting that the interface is invoked;

inputting the running information into the local recommendation model to obtain recommendation probabilities of resources in the resource list; and selecting a to-be-recommended resource according to the recommendation probabilities and displaying the to-be-recommended resource;

wherein updating the local recommendation model based on the online learning algorithm comprises:

acquiring current feature information in response to an invocation of a resource in the resource list;

obtaining a feature vector corresponding to the resource invocation according to the feature information; and updating a parameter of the local recommendation model according to the feature vector;

wherein the feature vector is stored in a local database of the terminal device, and the method further comprises:

after inputting the running information into the local recommendation model to obtain recommendation probabilities of resources in the resource list, adjusting a length of the resource list and a number of feature vectors stored in the local database according to the recommendation probabilities, comprising:

in response to the recommendation probability corresponding to a resource in the resource list being less than a preset probability threshold, monitoring a variance of the recommendation probabilities of the resource in latest N times and subsequent N times, and in response to the variance being less than a third preset value, deleting the resource from the resource list and deleting the feature vector related to the resource from the local database, wherein N is a positive integer.

9. The terminal device of claim 8, wherein after detecting that the interface is invoked, the method further comprises:

determining whether the interface invocation satisfies a model recommendation condition; and in response to the interface invocation not satisfying the model recommendation condition, performing resource recommendation according to an order of most recent usage of the resources in the resource list and selecting and displaying the to-be-recommended resource.

10. The terminal device of claim 9, wherein the feature vector is stored in a local database of the terminal device, and the model recommendation condition comprises one of the following two conditions:

a number of resources contained in the resource list is greater than or equal to a first preset value; or a number of feature vectors stored in the local database is greater than a second preset value.

* * * * *